(12) United States Patent
Wang et al.

(10) Patent No.: US 10,986,546 B2
(45) Date of Patent: *Apr. 20, 2021

(54) METHOD, APPARATUS, AND SYSTEM FOR DETECTING A RADIO NETWORK PROBLEM

(71) Applicant: HUAWEI TECHNOLOGIES CO., LTD., Guangdong (CN)

(72) Inventors: Xuelong Wang, Beijing (CN); Jun Wang, Shanghai (CN); Ying Huang, Shanghai (CN); Peter Legg, Kista (SE); Johan Johansson, Kungsången (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

This patent is subject to a terminal disclaimer.

(21) Appl. No.: 15/829,313

(22) Filed: Dec. 1, 2017

(65) Prior Publication Data

US 2018/0092005 A1   Mar. 29, 2018

Related U.S. Application Data

(63) Continuation of application No. 14/202,953, filed on Mar. 10, 2014, now Pat. No. 9,838,920, which is a (Continued)

(30) Foreign Application Priority Data

Feb. 20, 2009   (CN) .......................... 2009 1 0078405

(51) Int. Cl.
*H04W 36/00* (2009.01)
*H04W 76/18* (2018.01)
(Continued)

(52) U.S. Cl.
CPC ....... *H04W 36/0079* (2018.08); *H04W 24/08* (2013.01); *H04W 36/0055* (2013.01);
(Continued)

(58) Field of Classification Search
CPC . H04W 24/04; H04W 36/0055; H04W 76/18; H04W 76/19; H04W 36/0083; H04W 92/12; H04W 92/20; H04L 1/16
See application file for complete search history.

(56) References Cited

U.S. PATENT DOCUMENTS 8,121,589 B2 * 2/2012 Fischer ................ H04W 24/10
                                                       455/422.1
8,369,286 B2    2/2013 Hamabe et al.
(Continued)

FOREIGN PATENT DOCUMENTS

CN    1511138 A    7/2004
CN    1852531 A    10/2006
(Continued)

OTHER PUBLICATIONS

Qualcomm Europe, Nortel, Discovery of neighbor eNB IP address, 3GPP TSG-RAN WG3#61bis R3-082456, Oct. 3, 2008, 3 pages.
(Continued)

*Primary Examiner* — Yuwen Pan
*Assistant Examiner* — Umair Ahsan
(74) *Attorney, Agent, or Firm* — Gregg L. Jansen (57) ABSTRACT

A method, an apparatus, and a system for detecting a radio network problem are disclosed. The method includes: when a radio network problem occurs on a user equipment (UE), a first base station controlling a cell that a radio resource control (RRC) connection established with the UE, receives problem information about the radio network problem sent by the UE, in a procedure of re-establishing the RRC connection by the UE, and sends the problem information to
(Continued)

a second base station controlling a cell where the radio network problem occurs.

18 Claims, 7 Drawing Sheets

Related U.S. Application Data continuation of application No. 13/252,902, filed on Oct. 4, 2011, now Pat. No. 9,838,919, which is a continuation of application No. 13/213,944, filed on Aug. 19, 2011, which is a continuation of application No. PCT/CN2010/070639, filed on Feb. 11, 2010.

(51) Int. Cl.
*H04W 24/08* (2009.01)
*H04W 24/04* (2009.01)

(52) U.S. Cl.
CPC ....... *H04W 36/0058* (2018.08); *H04W 76/18* (2018.02); *H04W 24/04* (2013.01)

(56) References Cited

U.S. PATENT DOCUMENTS

| | | | |
|---|---|---|---|
| 9,838,919 B2* | 12/2017 | Wang | H04W 76/18 |
| 9,838,920 B2* | 12/2017 | Wang | H04W 76/18 |
| 2002/0082032 A1* | 6/2002 | Hunzinger | H04W 76/19 455/510 |
| 2006/0203738 A1 | 9/2006 | Fok et al. | |
| 2007/0238464 A1 | 10/2007 | Lim et al. | |
| 2007/0281683 A1* | 12/2007 | Goulet | H04W 24/04 455/423 |
| 2008/0076405 A1 | 3/2008 | Jen | |
| 2008/0167041 A1 | 7/2008 | Wang et al. | |
| 2008/0233941 A1 | 9/2008 | Jen et al. | |
| 2008/0261600 A1* | 10/2008 | Somasundaram | H04W 36/0055 455/436 |
| 2008/0268833 A1 | 10/2008 | Huang et al. | |
| 2009/0137265 A1* | 5/2009 | Flore | H04W 40/248 455/525 |
| 2009/0227251 A1* | 9/2009 | Lei | H04J 11/0069 455/425 |
| 2010/0105377 A1* | 4/2010 | Iwamura | H04W 24/08 455/424 |
| 2010/0208707 A1 | 8/2010 | Hamabe et al. | |
| 2010/0267378 A1* | 10/2010 | Hamabe | H04W 24/10 455/423 |
| 2010/0296415 A1 | 11/2010 | Sachs et al. | |
| 2011/0190016 A1 | 8/2011 | Hamabe et al. | |
| 2011/0300896 A1 | 12/2011 | Wang et al. | |

FOREIGN PATENT DOCUMENTS

| | | |
|---|---|---|
| CN | 1874582 A | 12/2006 |
| CN | 1890928 A | 1/2007 |
| CN | 101132611 A | 2/2008 |
| CN | 101150380 A | 3/2008 |
| CN | 101171862 A | 4/2008 |
| KR | 20070046980 A | 5/2007 |
| WO | 02061998 A2 | 8/2002 |
| WO | 2007130324 A2 | 11/2007 |
| WO | 2008016944 A2 | 2/2008 |
| WO | 2008025288 A1 | 3/2008 |
| WO | 2008131401 A1 | 10/2008 |
| WO | 2008151325 A1 | 12/2008 |
| WO | 2009022752 A1 | 2/2009 |
| WO | 2009041498 A1 | 4/2009 |
| WO | 2009084998 A1 | 7/2009 |
| WO | 2010080849 A2 | 7/2010 |

OTHER PUBLICATIONS

Huawei, Mobility Robustness Optimisation, 3GPP TSG RAN WG3 Meeting #59 bis R3-080754, Mar. 26, 2008, 5 pages.
Huawei, RLF Analysis, 3GPP TSG RAN WG2 Meeting #61bis R2-081697, Mar. 25, 2008, 3 pages.
Qualcomm Europe, RLF-based neighbour list optimization, 3GPP TSG-RAN WG2 meeting #60-bis R2-080346, 4 pages.
Huawei, Information exchange for Mobility Robustness Optimisation, 3GPP TSG-RAN WG3#63bis R3-090797, 2 pages.
CATT, UE measurements and logs for Mobility Robustness Optimisation, 3GPP TSG-RAN WG3#63bis R3-090912, 3 pages.
Janne Kurjenniemi et al., "Suitability of RSRQ Measurement for Quality Based Inter-Frequency Handover in LTE", IEEE ISWCS 2008, 5 pages.
3GPP TS 36.300 V10.0.0 (Jun. 2010) 3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 10), Technical Specification, Jun. 2010, 183 pages.
3GPP TS 36.331 V9.4.0 (Sep. 2010) 3rd Generation Partnership Project;Technical Specification Group Radio Access Network;Evolved Universal Terrestrial Radio Access (E-UTRA);Radio Resource Control (RRC);Protocol specification Release 9), Technical Specification, Sep. 2010, 252 pages.
3GPP TS 36.423 V9.4.0 (Sep. 2010) 3rd Generation Partnership Project;Technical Specification Group Radio Access Network;Evolved Universal Terrestrial Radio Access Network (E-UTRAN);X2 application protocol (X2AP)(Release 9), Technical Specification, Sep. 2010, 121 pages.
Nokia Siemens Networks et al., Support of UE-originated RLF reporting for Mobility Robustness SON use case. 3GPP TSG-WG2 Meeting #68bis Valencia, Spain, Jan. 18-22, 2010, R2-101843, 6 pages.
Motorola et al., Introduction of MRO procedures in stage 2. 3GPP TSG-RAN WG3 Meeting #66 Jeju, Korea, Nov. 9-13, 2009, R3-093370, 5 pages.
Huawei et al, Introduction of Radio Link Failure Indication procedure. 3GPP TSG-RAN3 Meeting #66 Jeju Island, South Korea, Nov. 9-13, 2009, R3-093379, 13 pages.
Huawei et al., Introduction of Handover Report procedure. 3GPP TSG-RAN WG3 Meeting #66 Jeju Island, South Korea, Nov. 9-13, 2009, R3-093380, 14 pages.
Huawei et al., Clarification of definitions of HO failure cases. 3GPP TSG-RAN WG3 Meeting #66bis Valencia, Spain, Jan. 18-22, 2010, R3-100510, 3 pages.
3GPP TS 36.331 V8.3.0 3rd Generation Partnership Project;Technical Specification Group Radio Access Network; Evolved Universal Terrestrial Radio Access (E-UTRA)Radio Resource Control (RRC);Protocol specification(Release 8),Technical Specification,Sep. 2008, 178 pages.
3GPP TS 36A23 V8.3.0 3rd Generation Partnership Project;Technical Specification Group Radio Access Network; Evolved Universal Terrestrial Radio Access Network (E-UTRAN);X2 application protocol (X2AP)(Release 8), Technical Specification, Sep. 2008, 85 pages.
3GPP TS 36.300 V8.7.0 3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 8), Technical Specification, Dec. 2008, 144 pages.

* cited by examiner

METHOD, APPARATUS, AND SYSTEM FOR DETECTING A RADIO NETWORK PROBLEM

CROSS-REFERENCE TO RELATED APPLICATIONS

This application is a continuation of U.S. patent application Ser. No. 14/202,953, filed on Mar. 10, 2014, now U.S. Pat. No. 9,838,920, which is a continuation of U.S. patent application Ser. No. 13/252,902, filed on Oct. 4, 2011, now U.S. Pat. No. 9,838,919, which is a continuation of U.S. patent application Ser. No. 13/213,944, filed on Aug. 19, 2011, which is a continuation of International Application No. PCT/CN2010/070639, filed on Feb. 11, 2010, which claims priority to Chinese Patent Application No. 200910078405.6, filed on Feb. 20, 2009. All of the aforementioned patent applications are hereby incorporated by reference in their entireties.

FIELD OF THE INVENTION

The present invention relates to the radio network field, and in particular, to a method, an apparatus and a system for detecting a radio network problem.

BACKGROUND OF THE INVENTION

There may be various radio network problems occur during the access of a user equipment (UE) to a radio network, for example, radio link failure (Radio Link Failure, RLF) or handover failure (Hand Over Failure, HOF), Handover Too Early, Handover Too Late, ping-pong handover.

When an RLF occurs on the UE, the UE re-establishes a radio resource control (Radio Resource Control, RRC) within a specified time; if the re-establishment fails within the specified time, the UE may initiate an RRC establishment request subsequently; when the UE receives a handover command and fails to perform a handover within the specified time, that is, an HOF occurs, the UE may perform an RRC re-establishment procedure within a specified time. Similarly, if the re-establishment fails within the specified time, the UE may also initiate an RRC establishment request. In addition, when an RLF occurs on the UE, a cell where the UE camps before the RLF occurs is referred to as a previous cell (P-Cell), and other cells are uniformly referred to as new cell (N-Cell). However, when an HOF occurs on the UE, because the handover concept is involved, there are three types of cell: source cell (S-Cell), target cell (T-Cell), and other cell (O-Cell).

Figure 1:
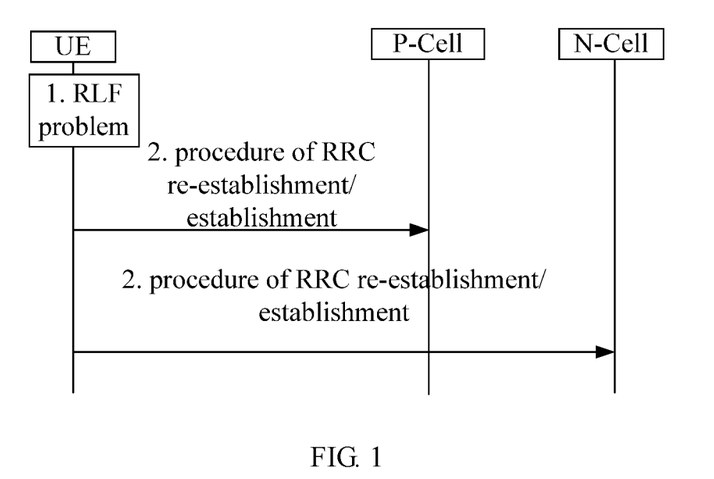
FIG. 1 is a schematic diagram of a procedure of RRC re-establishment or establishment when an RLF occurs on a UE in the prior art.

For example, when an RLF occurs on a UE, a procedure of RRC re-establishment or establishment is shown in FIG. 1. The procedure includes the following steps.

1. An RLF occurs on the UE.
2. The UE initiates an RRC connection re-establishment or establishment procedure.

Specifically, the UE may perform the RRC connection re-establishment in the P-Cell or the N-Cell; or after the RRC re-establishment fails, the UE may initiate a subsequent RRC establishment procedure in the P-Cell or the N-Cell.

Figure 2:
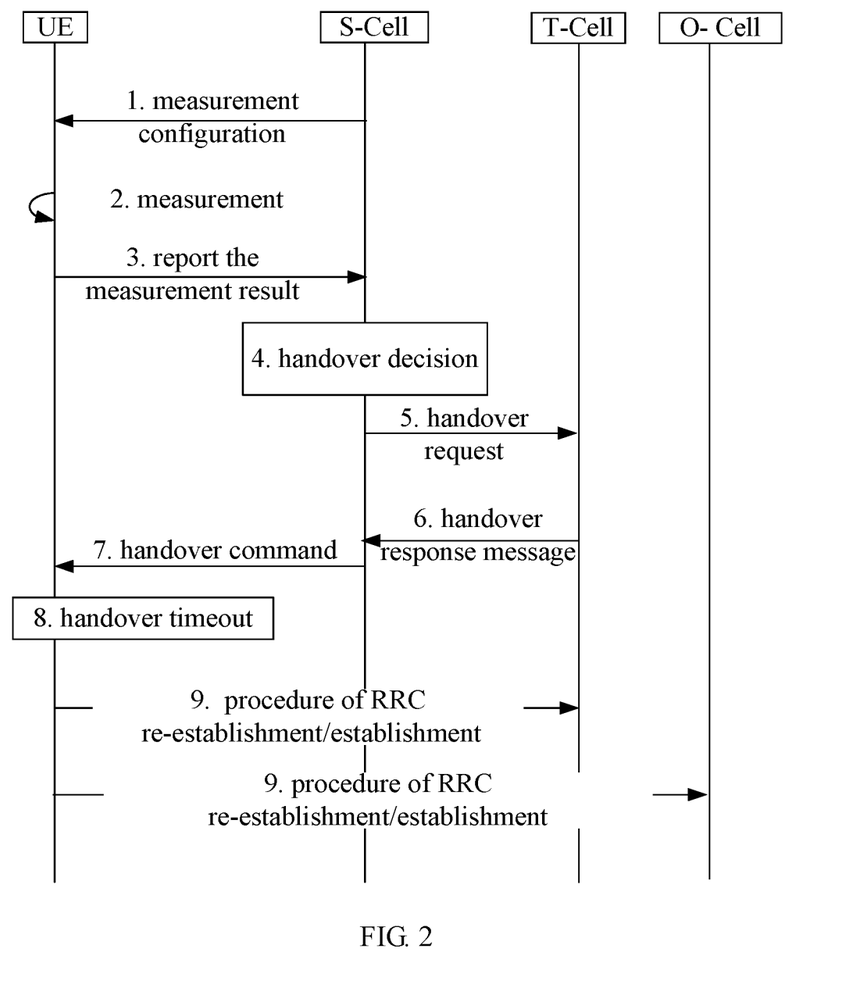
FIG. 2 is a schematic diagram of a procedure of RRC re-establishment or establishment when an HOF occurs on a UE in the prior art.

FIG. 2 is a schematic diagram of an RRC re-establishment or establishment procedure when a UE performs a handover and an HOF occurs. The procedure includes the following steps.

1. A source cell (S-Cell) performs measurement configuration on the UE.

2. The UE performs corresponding measurement.

3. If a result of the measurement meets a set condition, the UE reports a measurement report to the S-Cell.

4. The S-Cell decides to hand over the UE to a target cell (T-Cell) according to the measurement report reported by the UE.

5. The S-Cell sends a handover request message to the T-Cell.

6. The T-Cell returns a handover response message to the T-Cell.

7. The S-Cell sends a handover command to the UE.

8. In this case, if the radio signal of the T-Cell is not good, the UE may not hand over to the T-Cell within a specified time.

9. After a timer set on the UE side expires, an HOF occurs on the UE. In this case, the UE may initiate an RRC connection re-establishment procedure.

Specifically, the UE may perform the RRC connection re-establishment procedure in an S-Cell or a T-Cell or an O-Cell of a previous handover, where the O-Cell is a cell other than the S-Cell and the T-Cell; or after the RRC connection re-establishment fails, the UE initiates a subsequent RRC connection establishment procedure. Similarly, the RRC connection establishment procedure may also be performed in the S-Cell, the T-Cell or the O-Cell.

According to the solution in the prior art, no solution that can automatically identify and detect these radio network problems is available in the prior art. Consequently, various radio network problems such as Handover Too Early or Handover Too Late may occur due to parameter settings, so that call drops occur on the UE, therefore affecting a user experience.

SUMMARY OF THE INVENTION

In one aspect, the present invention provides a method for detecting a radio network problem. The method includes: when a radio network problem occurs on a UE, a first base station controlling a cell that an RRC connection established with the UE receives problem information about the radio network problem sent by the UE, in a procedure of re-establishing or establishing an RRC connection by the UE or after an RRC connection has been established, and sends the problem information to a second base station controlling a cell where the radio network problem occurs.

In another aspect, the present invention provides an apparatus for detecting a radio network problem. The apparatus includes a problem information receiving unit configured to: when a radio network problem occurs on a UE, receive problem information about the radio network problem sent by the UE, in a procedure of re-establishing or establishing an RRC connection by the UE or after an RRC connection has been established, and send the problem information to a server or a cell where the radio network problem occurs.

In another aspect, the present invention provides a method for reporting a radio network problem. The method includes: when a radio network problem occurs on a UE, sending problem information about the radio network problem to a first base station controlling a cell that an RRC connection established with the UE, in a procedure of re-establishing or establishing an RRC connection or after establishing an RRC connection, where the problem information includes signal quality and the signal quality includes reference signal received power (RSRP) and/or reference signal received quality (RSRQ).

In still another aspect, the present invention provides a UE. The UE includes a sending unit configured to: when a radio network problem occurs on the UE, send problem information about the radio network problem to a first base station controlling a cell that an RRC connection established, in a procedure of establishing or re-establishing an RRC connection by the UE or after the UE establishes an RRC connection, where the problem information includes signal quality and the signal quality includes reference signal received power (RSRP) and/or reference signal received quality (RSRQ).

In still another aspect, the present invention provides a radio network system. The system includes the preceding apparatus at network side and the preceding UE.

According to the above technical solution, when a radio network problem occurs on a UE, in a procedure of re-establishing or establishing an RRC connection by the UE or after the UE establishes an RRC connection, a cell that an RRC connection established receives problem information about the radio network problem sent by the UE, and forwards the problem information to a server or a cell where the radio network problem occurs. In this way, the network side can automatically identify and detect the radio network problem which occurs on the UE, so that the network can perform self-adjustment and optimization, therefore improving the network performance and satisfying use requirements of users.

DETAILED DESCRIPTION OF THE EMBODIMENTS

Embodiments of the present invention provide a method, an apparatus, and a system for detecting a radio network problem, so that the network side can automatically identify and detect the radio network problem which occurs on the UE. In this way, the network can perform self-adjustment and optimization, therefore improving the network performance and satisfying use requirements of users.

An embodiment of the present invention provides a method for detecting a radio network problem. The method is as follows: when a radio network problem occurs on a UE, in a procedure of establishing an RRC connection by the UE or after an RRC connection is established, the network side receives problem information about the radio network problem sent by the UE. In this way, the network side can detect the radio network problem after receiving the problem information about the radio network problem, which provides a basis for the network side to optimize parameters and solve the radio network problem.

The following describes the embodiments of the present invention in detail with reference to the accompanying drawings.

Embodiment 1

Figure 3:
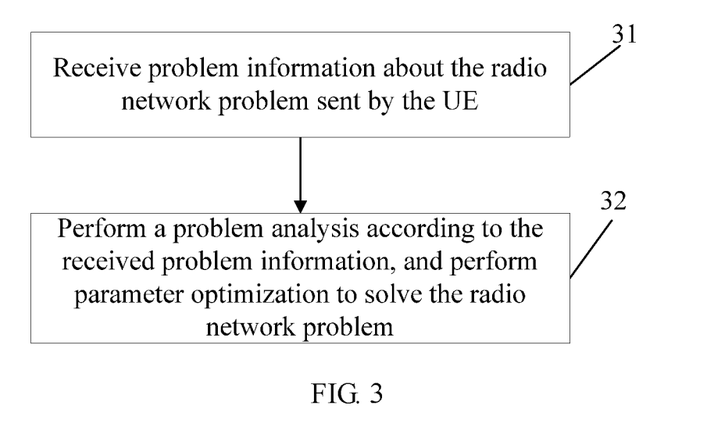
FIG. 3 is a schematic flowchart of a method according to Embodiment 1 of the present invention.

FIG. 3 is a schematic flowchart of a method for detecting a radio network problem according to Embodiment 1 of the present invention. The method includes the following content.

31. Receive problem information about a radio network problem sent by the UE.

In this step, when a radio network problem occurs on the UE, in a procedure of establishing an RRC connection by the UE or after an RRC connection is established, the network side receives the problem information about the radio network problem sent by the UE. The network side may be a cell that the RRC connection established or other network device.

The radio network problem may be a radio link failure (RLF) problem, handover failure (HOF) problem, Handover Too Early, Handover Too Late or ping-pong handover.

More specifically, the problem information may be carried in an RRC re-establishment message or an RRC establishment message in a procedure of RRC re-establishment or establishment, or be carried in other messages after the procedure of RRC re-establishment or establishment is completed, for example, the problem information may be carried in a user-defined message.

In addition, in a specific implementation procedure, if the radio network problem is an RLF problem, the problem information about the RLF may include one or more of the following: information of an error cause, identity information of an S-Cell in the case of the RLF, identity information of a tracking area (TA) of the S-Cell in the case of the RLF, identity information of the UE, and time information from the time when the RLF occurs to the time when the RRC re-establishment or establishment succeeds. If the radio network problem is an HOF problem, the problem information about the HOF may include one or more of the following: information of an error cause, both identity information of an S-Cell and a T-Cell in the case of the HOF, identity information of a tracking area of the S-Cell in the case of the HOF, identity information of the UE, and time information from the time when a handover command is received to the time when the RRC re-establishment or establishment succeeds.

After step 31 is executed, the network side can automatically identify and detect the radio network problem which occurs on the UE, so that the network can perform self-adjustment and optimization, therefore improving the network performance and satisfying use requirements of users.

In addition, after the network receives the problem information, step 32 may be further executed.

32. Perform a problem analysis according to the received problem information and optimize parameters to solve the radio network problem.

In a specific implementation procedure, if the network side is a cell that an RRC connection established with the UE and a radio network problem occurs in the cell, the cell directly performs a problem analysis on the received problem information and optimizes parameters to solve the radio network problem.

The network side may also forward the received problem information through the cell that an RRC connection established with the UE to a cell where the radio network problem occurs, and the cell where the radio network problem occurs performs a problem analysis on the received problem information and optimizes parameters to solve the radio network problem. In the specific implementation, the received problem information may be forwarded to the cell where the radio network problem occurs through an inter-base station interface or through transference of a network element, where the network element may be a mobility management entity (MME) in the core network, an element management system (EMS) or a network management system (NMS).

In addition, the network side may also upload the received problem information to a special server through the cell that an RRC connection established, and then the server performs analysis and processing on the received problem information. In this way, the problem may be analyzed and processed on a centralized basis. Specifically, the received problem information may be forwarded to the element management system (EMS) through a southbound interface (Itf-S); or the received problem information may be forwarded to the network management system (NMS) server through a northbound interface Itf-N for centralized analysis and processing.

In the specific implementation, the network side may adopt different processing modes according to different radio network problems which occur on the UE. Specifically, when a radio network problem occurs on the UE is a radio link failure (RLF), if the cell that an RRC connection established with the UE is a P-Cell where the RLF occurs, the P-Cell may directly perform a problem analysis on the received problem information and optimize parameters to solve the radio network problem.

If the cell that an RRC connection established with the UE is an N-Cell, the N-Cell may send the received problem information to a P-Cell where the RLF occurs. For example, the N-Cell may forward the received problem information to the P-Cell where the RLF occurs through an inter-base station interface or through transference of a network element; the P-Cell performs a problem analysis on the received problem information and optimizes parameters to solve the radio network problem.

When the radio network problem occurs on the UE is a handover failure (HOF), if the cell that an RRC connection established with the UE is an S-Cell or a P-Cell where the HOF occurs, the S-Cell or the P-Cell may directly perform a problem analysis on the received problem information and optimize parameters to solve the radio network problem.

Or, if the cell that an RRC connection established with the UE is a T-Cell, the T-Cell forwards the received problem information to an S-Cell where the HOF occurs, and the S-Cell performs a problem analysis on the received problem information and optimizes parameters to solve the radio network problem.

Or, if the cell that an RRC connection established with the UE is an O-Cell, the O-Cell forwards the received problem information to an S-Cell where an HOF occurs or a T-Cell where an HOF occurs, and the S-Cell or the T-Cell performs a problem analysis on the received problem information and optimizes parameters to solve the radio network problem.

More specifically, the problem information about the radio network problem that the network side receives from the UE may further include information such as the frequency of an old/source cell, a physical cell identity (PCI), a cell global identity (CGI), IP, a public land mobile network (PLMN) ID, and signal quality (for example, Reference Signal Received Power (RSRP), Reference Signal Received Quality (RSRQ)). The access control base station of an N-Cell/T-Cell may add a new cell adjacency relationship or trigger an establishment of an X2 interface according to the preceding information, therefore solving a radio network problem (for example, the RLF) due to weak coverage.

This embodiment provides a method for detecting a radio network problem by the network side and further provides a method for solving the network problem according to the network problem information. By using the technical solution provided in this embodiment, the network can detect the network problem which occurs on the UE in time, perform a problem analysis on the problem information, find the problem causes, and optimize parameters to solve the radio network problem.

Embodiment 2

Figure 4:
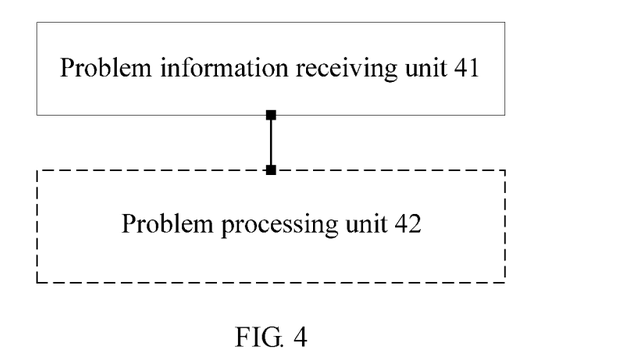
FIG. 4 is a schematic structure diagram of an apparatus according to Embodiment 2 of the present invention.

Embodiment 2 of the present invention provides an apparatus at network side for detecting a radio network problem. FIG. 4 is a schematic structure diagram of the apparatus according to the Embodiment 2 of the present invention. As shown in FIG. 4, the apparatus includes a problem information receiving unit 41.

The problem information receiving unit 41 is configured to: when a radio network problem occurs on the UE, in a procedure of establishing an RRC connection by the UE or after an RRC connection is established, receive problem information about the radio network problem sent by the UE. For the specific receiving method, refer to the description of the Embodiment 1.

In addition, the apparatus may further include a problem processing unit 42 configured to perform a problem analysis according to the problem information received by the problem information receiving unit, and optimize parameters to solve the radio network problem. The specific analysis and processing method has been described in the Embodiment 1.

The apparatus at network side for detecting a radio network problem according to this embodiment can detect a radio network problem which occurs on the UE in time, and know problem information about the radio network problem, which provides a basis for the network side to solve the radio network problem. In this way, the network side can further perform a problem analysis and optimize parameters to solve the radio network problem.

Embodiment 3

Figure 5:
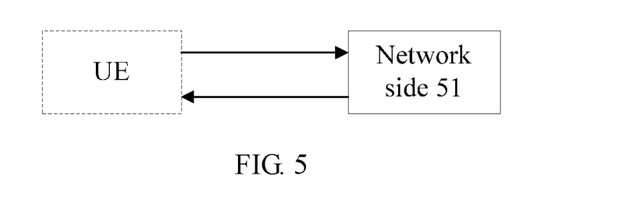
FIG. 5 is a schematic structure diagram of a system according to Embodiment 3 of the present invention.

Embodiment 3 of the present invention provides a system for detecting a radio network problem. FIG. 5 is a schematic structure diagram of the system according to the Embodiment 3 of the present invention. The system includes a network side 51 configured to: when a radio network problem occurs on the UE, in a procedure of establishing an RRC connection or after an RRC connection is established, receive problem information about the radio network problem sent by the UE.

In addition, the network 51 is further configured to perform a problem analysis according to the received problem information and optimize parameters to solve the radio network problem. For the specific problem analysis and processing method, refer to the description of the method Embodiment 1.

By using the system for detecting the radio network problem according to this embodiment, the network can detect a radio network problem which occurs on the UE in time, and know the problem information about the radio network problem, which provides a basis for the network side to solve the radio network problem. In this way, the network side can perform a problem analysis and optimize parameters to solve the radio network problem.

It should be noted that: in the preceding apparatus and system provided in embodiments of the present invention, each unit is divided only according to the function logics. However, the division is not limited thereto so long as the unit can implement corresponding functions. In addition, the specific name of each functional unit is only for the convenience of differentiation and is not intended to limit the protection scope of the present invention.

Embodiment 4

Figure 6:
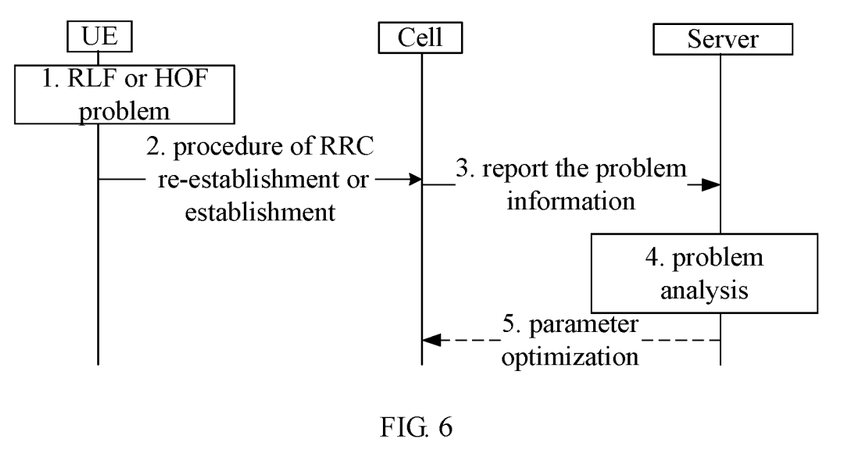
FIG. 6 is a schematic diagram of signaling interactions in a specific instance according to Embodiment 4 of the present invention.

The following describes the method for detecting a radio network problem in detail with specific instances. FIG. 6 is a schematic diagram of signaling interactions in a specific instance according to Embodiment 4 of the present invention. The procedure includes the following content.

1. An RLF or an HOF occurs on the UE.
2. In a procedure of RRC re-establishment or RRC establishment after RRC re-establishment fails performed by the UE, the cell that an RRC connection established with the UE receives problem information about the RLF or the HOF sent by the UE.

The problem information may be carried in an RRC establishment message (RRC Connection Request), an RRC re-establishment message (RRC Connection Re-establishment), or in a message extended after the UE establishes an RRC connection.

In a specific implementation procedure, if an RLF occurs, the cell that an RRC connection established with the UE includes a P-Cell and an N-Cell; if an HOF occurs, the cell that an RRC connection established with the UE includes an S-Cell, a T-Cell, and an O-Cell.

3. The cell that an RRC connection established with the UE forwards the problem information about the RLF or the HOF to a server.

Through step 1 to step 3 above, the network side detects the radio network problem. Further, the procedure of performing a problem analysis and a parameter optimization by the server according to the problem information includes the following steps:

4. The server performs a problem analysis, for example, performing problem analysis according to the problem information measured within a period of time.
5. Adjust cell parameters according to a result of the problem analysis to solve the problem.

In this way, by using the technical solution provided in the Embodiment 4 of the present invention, the network side can automatically identify and detect the radio network problem which occurs on the UE, so that the network can perform self-adjustment and optimization, therefore improving the network performance and satisfying use requirements of users.

Embodiment 5

Figure 7:
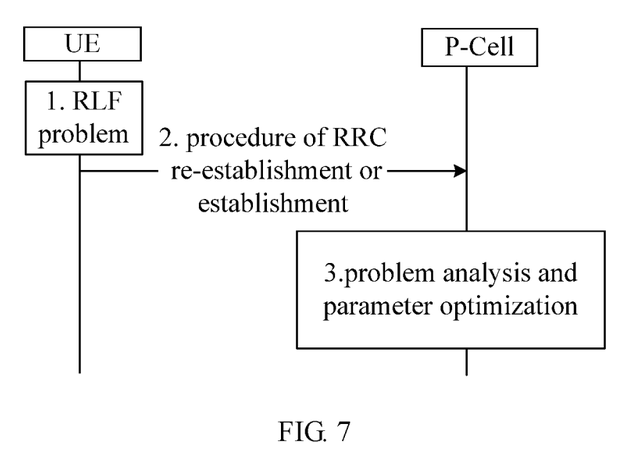
FIG. 7 is a schematic diagram of signaling interactions in a specific instance according to Embodiment 5 of the present invention.

Embodiment 5 is a solution instance after an RLF occurs on a UE. In this embodiment, a cell that receives the problem information may directly perform a problem analysis to achieve the purpose of parameter optimization. FIG. 7 is a schematic diagram of signaling interactions in a specific instance according to the Embodiment 5 of the present invention. As shown in FIG. 7, a procedure of RRC re-establishment or establishment when an RLF occurs on the UE includes the following content.

1. An RLF occurs on the UE.
2. The P-Cell receives problem information about the RLF reported by the UE, where the problem information about the RLF may be carried in an RRC establishment or re-establishment message, or be carried in a message extended after an RRC connection is established.

In a specific implementation procedure, any combination of the following parameters may be carried in the RRC establishment or re-establishment message or in the extended message to describe the problem information about the RLF:

(A) Information of an error cause, for example, RLF or HOF.

(B) Identity of a P-Cell and/or an N-Cell when an RLF occurs on the UE. In this embodiment, the identify is a related identity of a P-Cell and/or an O-Cell, for example, identity information such as frequency, Physical Cell Identity (PCI), Cell Global Identity (CGI), PLMN ID, signal quality (RSRP, RSRQ.

(C) Identity information of a Tracking Area (TA) of the serving cell when an RLF occurs on the UE.

(D) Unique identity information of the UE, for example, cell-radio network temporary identity (C-RNTI), temporary mobile subscriber identity (TMSI), and international mobile subscriber identity (IMSI). A UE related context may be found according to this parameter, so that the context of the UE may be analyzed to solve the problem better.

(E) Time information from a time when the RLF occurs on the UE to a time when the RRC establishment or re-establishment succeeds. Causes for the network problem may be inferred according to this parameter. For example, when the time value is small, it may be inferred that the problem is Handover Too Early or Handover Too Late due to improper parameter settings; when the time value is large, it may be inferred that the problem is caused by coverage holes.

Through step 1 to step 2 above, the network side detects the radio network problem. Further, the process of analysis and parameter optimization performed by the P-Cell according to the problem information include step 3:

3. The P-Cell performs problem analysis according to the problem information fed back in step 2, for example, long-term measurement is performed directly and find out the root cause of the problem by performing an analysis, and then performing cell parameter optimization to solve the problem.

Similarly, by using the technical solution provided in the Embodiment 6 of the present invention, the network side can automatically identify and detect the radio network problem which occurs on the UE, so that the network can perform self-adjustment and optimization, therefore improving the network performance and satisfying use requirements of users.

Embodiment 6

Figure 8:
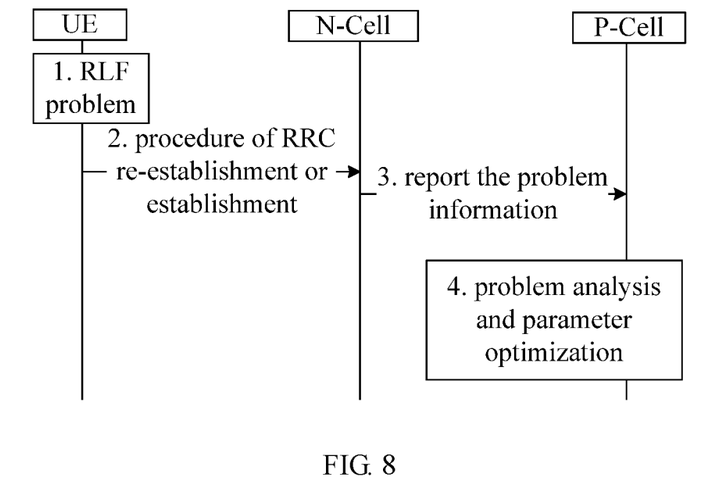
FIG. 8 is a schematic diagram of signaling interactions in a specific instance according to Embodiment 6 of the present invention.

Embodiment 6 is also a solution instance after an RLF occurs on a UE. This embodiment is different from the Embodiment 5 in that: in this embodiment, after an RLF occurs on the UE, a procedure of RRC re-establishment or establishment is performed in an N-Cell. FIG. 8 is a schematic diagram of signaling interactions in a specific instance according to the Embodiment 6. The procedure includes the following content.

1. An RLF occurs on the UE.
2. The N-Cell receives problem information about the RLF reported by the UE, where the problem information about the RLF may be carried in an RRC establishment or re-establishment message, or be carried in a message extended after the UE establishes an RRC connection.

In a specific implementation procedure, the parameter information carried in the RRC establishment or re-establishment message, or the extended message is the same as the parameter information in the Embodiment 5 of the present invention.

3. The N-Cell forwards the problem information to a P-Cell where the RLF occurs. In a specific implementation procedure, the identity of the P-Cell may be found according to the cell identity information carried in the problem information about the RLF reported by the UE.

Through step 1 to step 3 above, the network detects the radio network problem. Further, the process of analysis and parameter optimization performed by the P-Cell according to the problem information includes:

4. The P-Cell performs problem analysis according to the problem information fed back in step 3, for example, long-term measurement is performed and finding out the root cause of the problem by performing an analysis, and then performing parameter optimization to solve the problem.

Similarly, by using the technical solution provided in the Embodiment 6 of the present invention, the network side can automatically identify and detect the radio network problem which occurs on the UE, so that the network can perform self-adjustment and optimization, therefore improving the network performance and satisfying use requirements of users.

Embodiment 7

Figure 9:
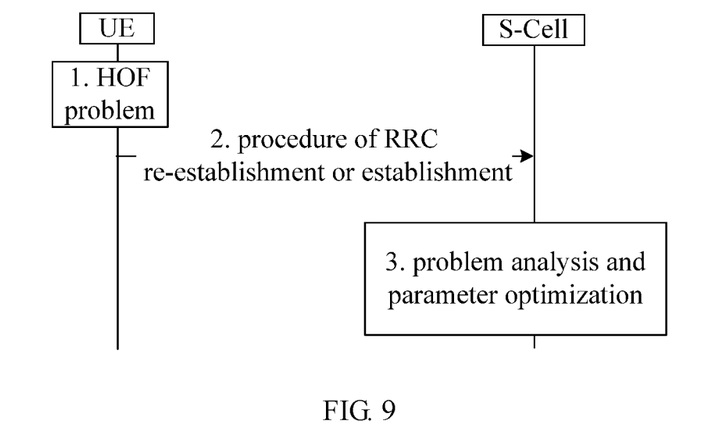
FIG. 9 is a schematic diagram of signaling interactions in a specific instance according to Embodiment 7 of the present invention.

This Embodiment 7 is a solution instance after an HOF occurs on a UE. In the Embodiment 7, a cell that receives the problem information may directly perform a problem analysis to achieve the purpose of parameter optimization. FIG. 9 is a schematic diagram of signaling interactions in a specific instance according to the Embodiment 7 of the present invention. As shown in FIG. 9, a procedure of RRC re-establishment or establishment is performed in an S-Cell when an HOF occurs on the UE includes the following content.

1. An HOF occurs on the UE.
2. The S-Cell receives problem information about the HOF reported by the UE, where the problem information about the HOF may be carried in an RRC establishment or re-establishment message, or be carried in a message extended after the UE establishes an RRC connection.

In a specific implementation procedure, the following parameters may be carried in the RRC establishment or re-establishment message or in the extended message to describe the following problem information about the HOF:

(A) Information of an error cause;

(B) Identity information of the S-Cell and a T-Cell when an HOF occurs on the UE, for example, a frequency, a physical cell identity (Physical Cell Identity, PCI), a cell global identity (Cell Global Identity, CGI), an IP, a PLMN ID, and signal quality (RSRP, RSRQ).

(C) Identity information of a tracking area (Tracking Area, TA) of the S-Cell when an HOF occurs on the UE.

(D) Unique identity of the UE, for example, a C-RNTI, a TMSI, or an IMSI.

(E) Time information from the time when the UE receives a handover command to the time when the RRC establishment or re-establishment succeeds.

Through step 1 to step 2 above, the network detects the radio network problem. Further, the process of analysis and parameter optimization performed by the S-Cell according to the problem information includes:

3. The S-Cell performs problem analysis according to the problem information fed back in step 2, for example, long-term measurement is performed and finding out the root cause of the problem by performing an analysis, and then performing parameter optimization to solve the problem.

Similarly, by using the technical solution provided in the Embodiment 7 of the present invention, the network side can automatically identify and detect the radio network problem which occurs on the UE, so that the network can perform self-adjustment and optimization, therefore improving the network performance and satisfying use requirements of users.

Embodiment 8

Figure 10:
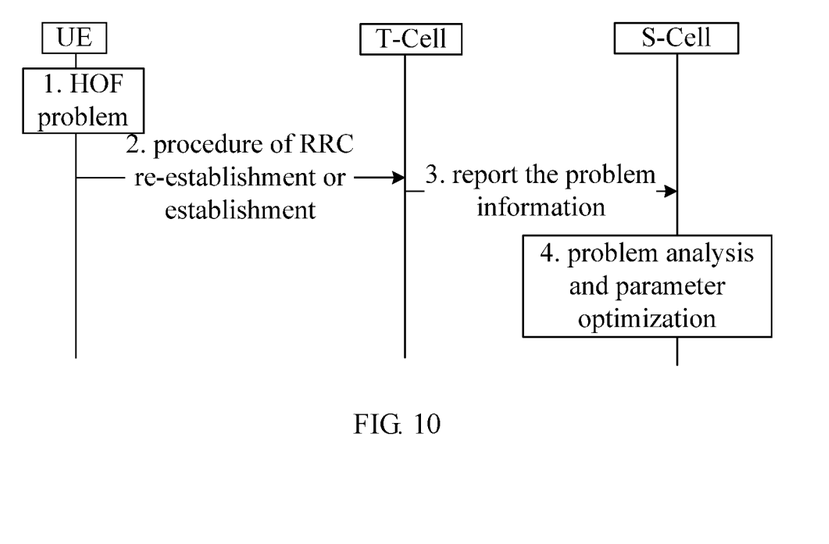
FIG. 10 is a schematic diagram of signaling interactions in a specific instance according to Embodiment 8 of the present invention.

Embodiment 8 is also a solution instance after an HOF occurs on a UE. The Embodiment 8 is different from the Embodiment 7 in that: in the Embodiment 8, after an HOF occurs on the UE, a procedure of RRC re-establishment or establishment is performed in a T-Cell. FIG. 8 is a schematic diagram of signaling interactions in a specific instance according to the Embodiment 8. The procedure includes the following content.

1. An HOF occurs on the UE.
2. The T-Cell receives problem information about the HOF reported by the UE, where the problem information about the HOF may be carried in an establishment or re-establishment message, or be carried in a message extended after the UE establishes an RRC connection.

The parameter information carried in the establishment or re-establishment message or the extended message is the same as the parameter information in the Embodiment 7 of the present invention.

3. The T-Cell forwards the problem information to an S-Cell where the HOF occurs. In the specific implementation, the identity information of the S-Cell is obtained according to cell identity information carried in the problem information about the HOF reported by the UE.

Through step 1 to step 3 above, the network detects the radio network problem. Further, the procedure of analysis and parameter optimization performed by the S-Cell according to the problem information includes:

4. The S-Cell performs problem analysis according to the problem information fed back in step 3, for example, long-term measurement is performed and finding out the root cause of the problem by performing an analysis, and then performing parameter optimization to solve the problem.

In a specific implementation procedure, a message between the T-Cell and the S-Cell may be transferred through an existing UE CONTEXT RELEASE message or a new user-defined message.

Similarly, by using the technical solution provided in the Embodiment 8 of the present invention, the network side can automatically identify and detect the radio network problem which occurs on the UE, so that the network can perform self-adjustment and optimization, therefore improving the network performance and satisfying use requirements of users.

Embodiment 9

Figure 11:
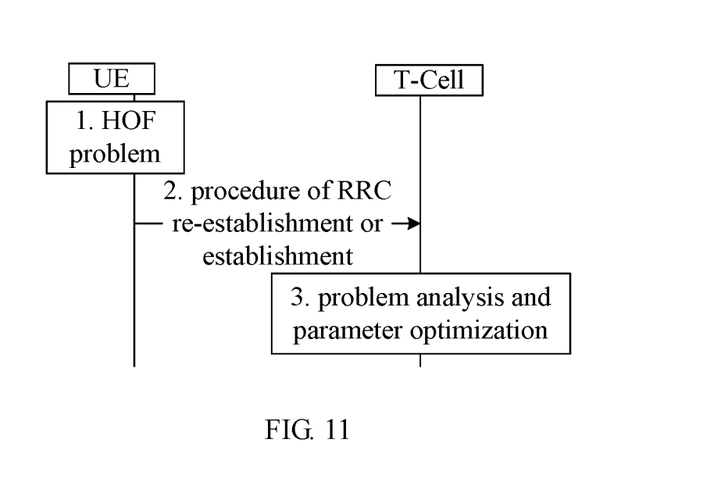
FIG. 11 is a schematic diagram of signaling interactions in a specific instance according to Embodiment 9 of the present invention.

Embodiment 9 is also a solution instance after an HOF occurs on a UE. After the HOF occurs, a procedure of RRC re-establishment or establishment is performed in a T-Cell. This embodiment 9 is different from the Embodiment 8 in that: in this embodiment 9, the T-Cell directly performs corresponding problem analysis and processing. FIG. 11 is a schematic diagram of signaling interactions in a specific instance according to the Embodiment 9 of the present invention. The procedure includes the following content.

1. An HOF occurs on the UE.
2. The T-Cell receives problem information about the HOF reported by the UE, where the problem information about the HOF may be carried in an RRC establishment or re-establishment message, or be carried in a message extended after the UE establishes an RRC connection.

The parameter information carried in the RRC establishment or re-establishment message or the extended message is the same as the parameter information in the Embodiment 7 of the present invention.

Through step 1 to step 2 above, the network side detects the radio network problem. Further, the procedure of analysis and parameter optimization performed by the T-Cell according to the problem information includes:

3. The T-Cell performs problem analysis according to the problem information fed back in step 2, for example, long-term measurement is performed and finding out the root cause of the problem by performing an analysis, and then performing parameter optimization to solve the problem.

Similarly, by using the technical solution provided in the Embodiment 9 of the present invention, the network can automatically identify and detect the radio network problem which occurs on the UE, so that the network can perform self-adjustment and optimization, therefore improving the network performance and satisfying use requirements of users.

Embodiment 10

Figure 12:
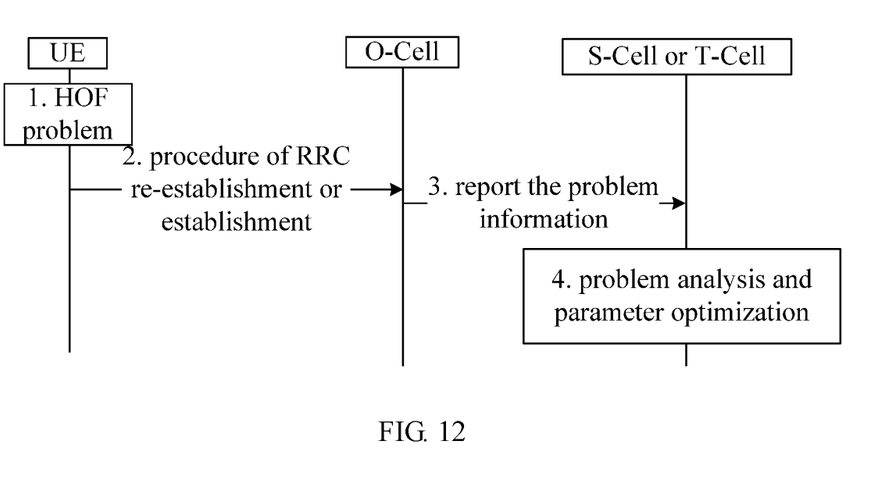
FIG. 12 is a schematic diagram of signaling interactions in a specific instance according to Embodiment 10 of the present invention.

Embodiment 10 is also a solution instance after an HOF occurs on a UE. The Embodiment 10 is different from the Embodiment 9 in that: in the Embodiment 9, after the HOF occurs, a procedure of RRC re-establishment or establishment is performed in an O-Cell. FIG. 12 is a schematic diagram of signaling interactions in a specific instance according to the Embodiment 10. The procedure includes the following content.

1. An HOF occurs on the UE.
2. The O-Cell receives problem information about the HOF reported by the UE, where the problem information about the HOF may be carried in an RRC establishment or re-establishment message, or be carried in a message extended after the UE establishes an RRC connection.

The parameter information carried in the RRC establishment or re-establishment message or the extended message is the same as the parameter information in the Embodiment 7 of the present invention.

3. The O-Cell forwards the problem information to an S-Cell or a T-Cell where the HOF occurs. In a specific implementation procedure, the identity information of the S-Cell or the T-Cell may be obtained according to the cell identity information carried in the problem information about the HOF reported by the UE.

Through step 1 to step 3 above, the network side detects the radio network problem. Further, the process of analysis and parameter optimization performed by the S-Cell according to the problem information includes:

4. The S-Cell or the T-Cell performs problem analysis according to the problem information fed back in step 3, for example, long-term measurement is performed and finding out the root cause of the problem by performing an analysis, and then performing parameter optimization to solve the problem.

By using the technical solution provided in the Embodiment 10 of the present invention, the network side can automatically identify and detect the radio network problem which occurs on the UE, so that the network can perform self-adjustment and optimization, therefore improving the network performance and satisfying use requirements of users.

It is understandable to those skilled in the art that all or part of the steps in the methods provided in the preceding embodiments may be performed by hardware instructed by a program. The program may be stored in a computer readable storage medium, such as a read only memory, a magnetic disk, and a compact disk-read only memory (CD-ROM).

In conclusion, by using the method, apparatus and system for detecting the radio network problem according to embodiments of the present invention, the network side can automatically identify and detect the radio network problem which occurs on the UE, so that the network can perform self-adjustment and optimization, therefore improving the network performance and satisfying use requirements of users.

The above descriptions are merely exemplary embodiments of the present invention, but not intended to limit the scope of the present invention. Any modification, equivalent replacement, or improvement made without departing from the spirit and principle of the present invention should fall within the protection scope of the present invention. Therefore, the protection scope of the present invention is subject to the appended claims.

The invention claimed is:

1. A non-transitory computer readable storage medium, comprising computer program codes which when executed by a device cause the device to execute the steps of:
   establishing a radio resource control (RRC) connection between the UE and a first base station controlling a new cell;
   receiving problem information about a radio network problem that occurred on a user equipment (UE) in a previous cell, the problem information including a field carrying information that the radio network problem was due to a handover failure or a radio link failure when the UE was in the previous cell controlled by a second base station; and
   transmitting the problem information to the second base station, the second base station controlling the previous cell where the handover failure occurred, the transmitting occurring upon receiving the problem information from the UE, the problem information being a basis for the second base station to perform a problem analysis in response to the radio network problem.

2. The non-transitory computer readable storage medium according to claim 1, wherein the problem information includes a signal quality of at least one of the previous cell or the new cell.

3. The non-transitory computer readable storage medium according to claim 2, wherein the signal quality includes at least one of a reference signal received power (RSRP) or a reference signal received quality (RSRQ).

4. The non-transitory computer readable storage medium according to claim 1, wherein the problem information includes at least one of identity information of the previous cell, identity information of the new cell, or identity information of the UE.

5. The non-transitory computer readable storage medium according to claim 4, wherein the identity information of the UE is a cell-radio network temporary identity (C-RNTI) of the UE; wherein the identity information of the previous cell includes at least one of a frequency, a physical cell identity (PCI), or a cell global identity (CGI) of the previous cell; and wherein the identity information of the new cell includes at least one of a frequency, a physical cell identity (PCI), or a cell global identity (CGI) of the new cell.

6. The non-transitory computer readable storage medium according to claim 5, the transmitting the problem information to the second base station comprising:
transmitting the problem information to the second base station through an interface between the first and second base stations; or transmitting the problem information to the second base station through transfer via a mobility management entity (MME) in a core network, an element management system (EMS), or a network management system (NMS).

7. A non-transitory computer readable storage medium, comprising computer program codes which when executed by a computer processor cause the compute processor to execute the steps of:
establishing a radio resource control (RRC) connection between the UE and a first base station controlling a new cell;
receiving problem information about a radio network problem that occurred on a user equipment (UE) in a previous cell, the problem information including a field carrying information that the radio network problem was due to a handover failure or a radio link failure when the UE was in the previous cell controlled by a second base station; and
transmitting the problem information to the second base station, the second base station controlling the previous cell where the handover failure occurred, the transmitting occurring upon receiving the problem information from the UE.

8. The non-transitory computer readable storage medium according to claim 7, wherein the problem information includes a signal quality of at least one of the previous cell or the new cell.

9. The non-transitory computer readable storage medium according to claim 8, wherein the signal quality includes at least one of a reference signal received power (RSRP) or a reference signal received quality (RSRQ).

10. The non-transitory computer readable storage medium according to claim 7, wherein the problem information includes at least one of identity information of the previous cell, identity information of the new cell, or identity information of the UE.

11. The non-transitory computer readable storage medium according to claim 10, wherein the identity information of the UE is a cell-radio network temporary identity (C-RNTI) of the UE; wherein the identity information of the previous cell includes at least one of a frequency, a physical cell identity (PCI), or a cell global identity (CGI) of the previous cell; and wherein the identity information of the new cell includes at least one of a frequency, a physical cell identity (PCI), or a cell global identity (CGI) of the new cell.

12. The non-transitory computer readable storage medium according to claim 7, the transmitting the problem information to the second base station comprising:
transmitting the problem information to the second base station through an interface between the first and second base stations; or transmitting the problem information to the second base station through transfer via a mobility management entity (MME) in a core network, an element management system (EMS), or a network management system (NMS).

13. A device in a wireless communication network, the device comprising:
a processor; and
a memory storing program instructions that, when executed by the processor, cause the device to:
establish a radio resource control (RRC) connection between the UE and a first base station controlling a new cell;
receive problem information about a radio network problem that occurred on a user equipment (UE) in a previous cell, the problem information including a field carrying information that the radio network problem was due to a handover failure or a radio link failure when the UE was in the previous cell controlled by a second base station; and
transmit the problem information to the second base station, the second base station controlling the previous cell where the handover failure occurred, the transmitting occurring upon receiving the problem information from the UE; the problem information being a basis for the second base station to perform a problem analysis in response to the radio network problem.

14. The device according to claim 13, wherein the problem information includes a signal quality of at least one of the previous cell or the new cell.

15. The device according to claim 14, wherein the signal quality includes at least one of a reference signal received power (RSRP) or a reference signal received quality (RSRQ).

16. The device according to claim 13, wherein the problem information includes at least one of identity information of the previous cell, identity information of the new cell, or identity information of the UE.

17. The device according to claim 16, wherein the identity information of the UE is a cell-radio network temporary identity (C-RNTI) of the UE; wherein the identity information of the previous cell includes at least one of a frequency, a physical cell identity (PCI), or a cell global identity (CGI) of the previous cell; and wherein the identity information of the new cell includes at least one of a frequency, a physical cell identity (PCI), or a cell global identity (CGI) of the new cell.

18. The device according to claim 13, the transmitting the problem information to the second base station comprising:

transmitting the problem information to the second base station through an interface between the first and second base stations; or transmitting the problem information to the second base station through transfer via a mobility management entity (MME) in a core network, an element management system (EMS), or a network management system (NMS).

* * * * *